(12) United States Patent
Amponsah

(10) Patent No.: US 11,573,247 B2
(45) Date of Patent: Feb. 7, 2023

(54) SYSTEMS AND METHODS FOR MANUFACTURING NANO-ELECTRO-MECHANICAL-SYSTEM PROBES

(71) Applicant: Xallent INC., Ithaca, NY (US)

(72) Inventor: Kwame Amponsah, Ithaca, NY (US)

(73) Assignee: Xallent INC., Ithaca, NY (US)

( * ) Notice: Subject to any disclaimer, the term of this patent is extended or adjusted under 35 U.S.C. 154(b) by 0 days.

(21) Appl. No.: 17/445,448

(22) Filed: Aug. 19, 2021

(65) Prior Publication Data
US 2021/0389346 A1  Dec. 16, 2021

Related U.S. Application Data

(60) Division of application No. 16/751,913, filed on Jan. 24, 2020, now Pat. No. 11,125,774, which is a
(Continued)

(51) Int. Cl.
*G01Q 70/06* (2010.01)
*G01Q 60/30* (2010.01)
(Continued)

(52) U.S. Cl.
CPC .......... *G01Q 70/06* (2013.01); *B41J 2/16505* (2013.01); *B41J 2/16526* (2013.01);
(Continued)

(58) Field of Classification Search
CPC ........ G01Q 70/06; G01Q 70/10; G01Q 70/14; G01G 60/30; B41J 2/16505; B41J 2/16526
(Continued)

(56) References Cited

U.S. PATENT DOCUMENTS

| 4,992,660 A | 2/1991 | Kobayashi |
| 5,148,103 A | 9/1992 | Pasiecznik, Jr. |

(Continued)

FOREIGN PATENT DOCUMENTS

| CN | 1159001 | 9/1997 |
| CN | 1160193 | 9/1997 |

(Continued)

OTHER PUBLICATIONS

Yoomin, Ahn et al., "Si multiprobes integrated with lateral actuators for independent scanning probe applications; AFM Si multiprobes with lateral actuators," Journal of Micromechanics & Microengineering, Institute of Physics Publishing, Bristol, GB, vol. 15, No. 6, Jun. 1, 2005, pp. 1224-1229; doi: 10.1088/0960-1317/15//6/012.

(Continued)

*Primary Examiner* — Jason L McCormack
(74) *Attorney, Agent, or Firm* — Bond, Schoeneck & King, PLLC

(57) ABSTRACT

Systems and methods for manufacturing multiple integrated tip probes for scanning probe microscopy. According to an embodiment is a microscope probe configured to analyze a sample, the microscope probe including: a movable probe tip including a terminal probe end; a first actuator configured to displace the movable probe tip along a first axis; and a detection component configured to detect motion of the movable probe tip in response to an applied signal; where the moveable probe tip comprises a metal layer affixed to a supporting layer, at least a portion of the metal layer at the terminal probe end extending past the supporting layer.

7 Claims, 12 Drawing Sheets

Related U.S. Application Data continuation of application No. 16/553,968, filed on Aug. 28, 2019, now Pat. No. 10,545,171, which is a division of application No. 15/054,626, filed on Feb. 26, 2016, now Pat. No. 10,436,814.

(60) Provisional application No. 62/121,208, filed on Feb. 26, 2015.

(51) Int. Cl.
  *G01Q 70/10* (2010.01)
  *G01Q 70/14* (2010.01)
  *B41J 2/165* (2006.01)

(52) U.S. Cl.
  CPC ............ *G01Q 60/30* (2013.01); *G01Q 70/10* (2013.01); *G01Q 70/14* (2013.01)

(58) Field of Classification Search
  USPC .......................................................... 347/29
  See application file for complete search history.

(56) References Cited

U.S. PATENT DOCUMENTS

| | | | |
|---|---|---|---|
| 5,349,735 A | 9/1994 | Kawase et al. | |
| 5,400,647 A | 3/1995 | Elings | |
| 5,426,302 A | 6/1995 | Marchman et al. | |
| 5,436,448 A | 7/1995 | Hosaka et al. | |
| 5,666,190 A | 9/1997 | Quate et al. | |
| 5,721,721 A | 2/1998 | Yanagisawa et al. | |
| 5,929,438 A | 7/1999 | Suzuki et al. | |
| 5,994,698 A | 11/1999 | Kawade et al. | |
| 6,075,585 A * | 6/2000 | Minne ................ | G01Q 10/045 355/71 |
| 6,078,186 A | 6/2000 | Hembree et al. | |
| 6,196,061 B1 | 3/2001 | Adderton et al. | |
| 6,369,385 B1 | 4/2002 | Muray et al. | |
| 7,349,223 B2 | 3/2008 | Haemer et al. | |
| 7,397,087 B2 | 7/2008 | Chinthakindi et al. | |
| 7,872,482 B2 | 1/2011 | Chong et al. | |
| 8,056,402 B2 | 11/2011 | Hecker et al. | |
| 8,440,523 B1 | 5/2013 | Guillom et al. | |
| 8,575,954 B2 | 11/2013 | Chong et al. | |
| 10,048,289 B2 | 8/2018 | Lal et al. | |
| 10,436,814 B2 | 10/2019 | Amponsah | |
| 2002/0153583 A1 | 10/2002 | Frazier et al. | |
| 2003/0020500 A1 | 1/2003 | Altmann et al. | |
| 2004/0004182 A1 | 1/2004 | Kranz et al. | |
| 2004/0157350 A1 | 8/2004 | McQuade et al. | |
| 2004/0223309 A1 | 11/2004 | Haemer et al. | |
| 2005/0026476 A1 | 2/2005 | Mok et al. | |
| 2006/0027878 A1 | 2/2006 | Chinthakindi et al. | |
| 2006/0257286 A1 | 11/2006 | Adams | |
| 2007/0234786 A1 | 10/2007 | Moon | |
| 2008/0246500 A1 | 10/2008 | Chong et al. | |
| 2008/0258059 A1 | 10/2008 | Saito et al. | |
| 2009/0001488 A1 | 1/2009 | Magana et al. | |
| 2009/0025465 A1 | 1/2009 | Kaya et al. | |
| 2009/0114000 A1 | 5/2009 | Hecker et al. | |
| 2010/0071098 A1 | 3/2010 | Mirkin et al. | |
| 2010/0115671 A1 | 5/2010 | Pryadkin et al. | |
| 2010/0132075 A1 | 5/2010 | Iyoki et al. | |
| 2010/0154085 A1 | 6/2010 | Maruyama et al. | |
| 2010/0186132 A1* | 7/2010 | Humphris ............... | G01Q 70/06 850/1 |
| 2010/0205698 A1 | 8/2010 | Faucher et al. | |
| 2010/0218286 A1 | 8/2010 | Lai et al. | |
| 2010/0229265 A1 | 9/2010 | Jin et al. | |
| 2010/0244867 A1 | 9/2010 | Chong et al. | |
| 2010/0257643 A1 | 10/2010 | Reifenberger et al. | |
| 2010/0263098 A1 | 10/2010 | Müller et al. | |
| 2011/0055982 A1 | 3/2011 | Watanabe et al. | |
| 2011/0089572 A1 | 4/2011 | Tezcan et al. | |
| 2011/0126329 A1 | 5/2011 | Despont et al. | |
| 2012/0090056 A1 | 4/2012 | Hirooka et al. | |
| 2013/0249584 A1 | 9/2013 | Lou et al. | |
| 2014/0331367 A1 | 11/2014 | Lal et al. | |
| 2016/0003866 A1 | 1/2016 | Chaigneau et al. | |
| 2018/0149673 A1 | 5/2018 | Huo et al. | |

FOREIGN PATENT DOCUMENTS

| | | |
|---|---|---|
| CN | 2465175 | 12/2001 |
| CN | 2488061 | 4/2002 |
| CN | 1416523 | 5/2003 |
| CN | 101920338 | 12/2010 |
| CN | 103235158 | 8/2013 |
| CN | 104087505 | 10/2014 |
| CN | 104105655 | 10/2014 |
| EP | 1085327 | 3/2001 |
| JP | H07120482 | 5/1995 |
| JP | 2005507175 | 3/2005 |
| JP | 2005300177 | 10/2005 |
| JP | 2010526284 | 7/2010 |
| JP | 4685309 | 5/2011 |
| KR | 20090128186 | 12/2009 |
| WO | 0120347 | 3/2001 |
| WO | 03019238 | 3/2003 |
| WO | 2011159351 | 12/2011 |
| WO | 2013090887 | 6/2013 |
| WO | 2014041677 | 3/2014 |
| WO | 2014114860 | 7/2014 |

OTHER PUBLICATIONS

Koester, S. J. et al., "Wafer-level 3D integration technology," IBM Journal of Research and Development, International Business Machines Corporation, New York, NY, US, vol. 52, No. 6, Nov. 1, 2008 (Nov. 1, 2008), KP002676160, ISSN: 0018-8646, DOI: 10.1147/JRD. 2008.5388565, pp. 583-597.

Song, Z.G. et al., "Front-end processing defect localization by contact-level passive voltage contrast technique and root cause analysis," Physical and Failure Analysis of Integrated Circuits, 2002, IPFA 2002, proceedings of the 9th International Symposium on the Jul. 8-12, 2002, Piscataway, NJ, USA, IEEE, Jul. 8, 2002 (Jul. 8, 2002), KP010597768, ISBM: 978-0-7803-7416-4, pp. 97-100.

Ming-Dou Ker et al., "Fully Process-Compatible Layout Design on Bond Pad to Improve Wire Bond Reliability in CMOS ICs," IEEE Transaction on Components and Packaging Technologies, IEEE Service Center, Piscataway, NJ, US, Vo. 25, No. 2, Jun. 1, 2002 (Jun. 1, 2002), pp. 309-316, XP011070771, ISSN: 1521-3331; figures 1-7.

Notification of Third Office Action, Chinese Patent Application No. 201680024285.X, dated Dec. 8, 2020, pp. 1-8.

Communication Pursuant to Article 94(3) EPC, European Patent Application No. 16709223.8, dated Jan. 19, 2021, pp. 1-4.

The Second Office Action, Chinese Patent Application No. 201680024285.X, dated Jun. 3, 2020, pp. 1-12.

Decision of Refusal, Japanese Patent Application No. 2017-563508, dated Sep. 20, 2019, pp. 1-3.

International Preliminary Report on Patentability, PCT Patent Application No. PCT/US2016/019806, dated Aug. 29, 2017, pp. 1-11.

International Search Report and the Written Opinion of the International Searching Authority, PCT Patent Application No. PCT/US2016/019806, dated Aug. 2, 2016, pp. 1-17.

Notification of First Office Action, Chinese Patent Application No. 201680024285.X, dated Jul. 18, 2019, pp. 1-9.

Communication Pursuant to Article 94(3) EPC, European Patent Application No. 16709223.8, dated Jul. 1, 2022, pp. 1-4.

\* cited by examiner

SYSTEMS AND METHODS FOR MANUFACTURING NANO-ELECTRO-MECHANICAL-SYSTEM PROBES

CROSS-REFERENCE TO RELATED APPLICATIONS

This application is a Continuation Application of U.S. patent application Ser. No. 16/751,913, filed on Jan. 24, 2020, which application claims priority to U.S. patent application Ser. No. 16/553,968, filed on Aug. 28, 2019, which application claims priority to U.S. patent application Ser. No. 15/054,626 filed on Feb. 26, 2016, which application claims priority to U.S. Provisional Patent Application Ser. No. 62/121,208, filed on Feb. 26, 2015, entitled "Systems and Methods for Manufacturing Nano-Electric-Mechanical-System Probes," the entire disclosures of which are incorporated herein by reference in their entireties.

FIELD OF THE INVENTION

The present disclosure is directed generally to systems and methods for manufacturing multiple integrated tip probes for scanning probe microscopy.

BACKGROUND

In order to achieve low-powered high-performance electronics, the size of transistors forming the building block of very large scale integrated (VLSI) circuits are drastically decreasing. However, tool resolution and sensitivity continue to be major challenges in semiconductor device fault isolation and analysis. As transistors continue to scale down to 10 nm nodes and beyond, well-known optical microscopy techniques no longer work due to wavelength limitations. For instance, conventional failure analysis methods involve the use of Focused Ion Beam (FIB) deposited pads or Scanning Electron Microscope (SEM). However, minute charge currents from the FIB and SEM adversely affect measured results. The induced charge from the FIB and SEM can even break the ultra-thin transistor tunneling gate oxide layer. In addition to this, Passive Voltage Contrast (PVC) techniques lack the sensitivity to identify faulty vias and contacts.

Single-tip Scanning Probe Microscopy, such as Atomic Force Probing (AFP) and Atomic Force Microscopy (AFM), is a powerful tool for non-destructive determination of root causes of IC chip failure, including extension to the sub 10 nm node regimes. However, AFM effectiveness is severely limited by its single tip design. As a result, a range of fundamental phenomena that exist in thin film materials and devices are inaccessible. As just one example, the effects of dislocations and grain boundaries in thin films cannot be characterized, as the ability to perform trans-conductance (conduction between two tips) measurements at the nanoscale is a critical gap. Trans-conductance would enable a richer understanding of how electrons transport and interact with their surroundings by offering insight into the local density of states, tip-sample coupling, transport mechanisms, scattering phase shifts and inelastic free mean paths of electrons.

Multiple-tips SPMs have been proposed as a way of overcoming the inherent limitations of the single-tip SPM. However, there have been significant challenges to engineering a suitable multiple-tips SPM. Previous approaches to a multiple-tip SPM have relied on independent macroscopically-fabricated probes. These platforms are complex, difficult to actuate, and have limited scale-down. They are also prohibitively expensive to manufacture.

Accordingly, there is a continued need in the art for multiple-tips SPMs that are both cost-effective and easily manufactured and functionalized to the specific investigation for which they will be utilized. Also needed are efficient and cost-effective methods of manufacturing multiple integrated tip probes.

SUMMARY OF THE INVENTION

The present disclosure is directed to systems and methods for manufacturing multiple integrated tip (MiT) probes for scanning probe microscopy. The MiT probe is a Nano-Electro-Mechanical System (NEMS) that integrates mechanical and electrical functionality in a monolithically-fabricated nano-structure which is tailored and functionalized to the specific investigation. The MiT scanning probe microscope provides two or more monolithically integrated cantilever tips that can be placed within nanometers of each other, with monolithically integrated transistors to amplify signals. As a result, the MiT SPM is able to perform atomic force microscopy without the need for laser tip alignment. Further, the MiT SPM is capable of nanoprobing surfaces where at least two of the integrated tips are in direct contact or in close proximity with the sample.

According to an aspect is a microscope probe configured to analyze a sample. The microscope probe includes a movable probe tip comprising a terminal probe end, wherein the moveable probe tip comprises a metal layer affixed to a supporting layer, at least a portion of the metal layer at the terminal probe end extending past the supporting layer.

According to an embodiment, the microscope probe includes a first actuator configured to displace the movable probe tip along a first axis, and a detection component configured to detect motion of the movable probe tip in response to an applied signal.

According to an embodiment, the metal is platinum, gold, tungsten, or nickel.

According to an embodiment, the supporting layer is silicon, silicon dioxide, or silicon nitride.

According to an embodiment, the microscope probe includes a plurality of probe tips each comprising a terminal probe end, each of the plurality of probe tips further comprising a metal layer affixed to a supporting layer, at least a portion of the metal layer at the terminal probe ends extending past the supporting layer.

According to an embodiment, the probe further includes an insulated interdigitated structure positioned between each of the plurality of probe tips.

According to an aspect is a microscope probe configured to analyze a sample. The microscope probe includes: a plurality of probe tips and an insulated interdigitated structure positioned between each of the plurality of probe tips.

According to an embodiment, the probe includes a first actuator configured to displace at least one of the plurality of probe tips along a first axis; and a detection component configured to detect motion of the at least one of the plurality of probe tips in response to an applied signal.

According to an aspect is a microscope probe configured to analyze a sample. The microscope probe includes: (i) a first probe tip; and (ii) a second probe tip positioned a first distance from the first probe tip, wherein the second probe tip is positioned vertically underneath the first probe tip.

According to an embodiment, the probe includes a first actuator configured to displace at least one of the first and second probe tips along a first axis; and a detection component configured to detect motion of the at least one of the first and second probe tips in response to an applied signal.

According to an embodiment, the first and second probe tips comprise a metal. According to an embodiment, the first and second probe tips comprise the same metal. According to an embodiment, the first and second probe tips each comprise a different metal.

According to another aspect is a microscope probe configured to analyze a sample. The microscope probe includes: (i) a movable probe tip supported by a substrate; (ii) a first actuator configured to displace the movable probe tip along a first axis; and (iii) a detection component configured to detect motion of the movable probe tip in response to an applied signal; (iv) a resonator configured to vibrate when the probe is in a vibrational mode; and (v) a capacitor affixed to the substrate.

According to another aspect is a method for analyzing a sample using a microscope probe, the method comprising the steps of: providing a microscope probe comprising: (i) a movable probe tip supported by a substrate; (ii) a resonator configured to vibrate when the probe is in a vibrational mode; and (iii) a capacitor affixed to the substrate; receiving a current from the capacitor; receiving a current from the resonator; electrically combining the current from the capacitor and the current from the resonator; and using the electrically combined current to improve a signal-to-noise ratio of the sample analysis.

According to an aspect is a method for implementing a transistor. The method includes the steps of: providing a sample; providing a microscope probe comprising a plurality of probe tips; contacting a first, outer probe tip of the plurality of probe tips to the sample, wherein the first outer probe tip is configured to act as a source terminal for the transistor; contacting a second, outer probe tip of the plurality of probe tips to the sample, wherein the second outer probe tip is configured to act as a drain terminal for the transistor; using a third, inner probe tip of the plurality of probe tips as a gate terminal for the transistor; and characterizing the sample with the plurality of probe tips.

According to an embodiment, the inner probe tip comprises a dielectric coating, and further wherein the dielectric coating is in contact with the surface.

According to an aspect is a method for implementing a variable resistor. The method includes the steps of: providing a sample; providing a microscope probe comprising a plurality of probe tips; contacting a first, outer probe tip of the plurality of probe tips to the sample; contacting a second, outer probe tip of the plurality of probe tips to the sample; contacting a third, inner probe tip of the plurality of probe tips to the sample; applying a voltage to either of the first and second outer probe tips, wherein the inner probe tip is deflected toward either the first or second outer probe tips; and characterizing the sample based on the deflection of the inner probe tip.

These and other aspects of the invention will be apparent from the embodiment(s) described hereinafter.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

The present disclosure includes various embodiments of a system and method for manufacturing multiple integrated tips (MiT) probes for use with a scanning probe microscope (SPM) system. The MiT-SPM enables nanoscale atomic imaging, electrical probing of trans-conductance, and parametric analysis of a transistor, among many other aspects.

Figure 1:
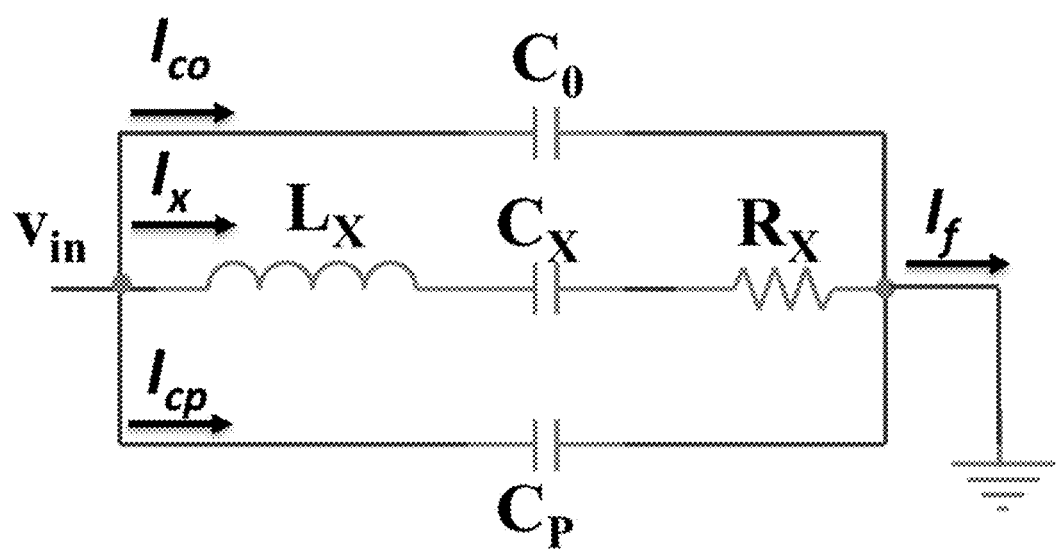
FIG. 1 is a schematic representation of a Butterworth-Van Dyke equivalent circuit for a NEMS resonator, in accordance with an embodiment.

Capacitive coupling and low signal-to-noise ratio leads to passive Nano-Electro-Mechanical-System (NEMS) devices generally having lower performance. FIG. 1 shows the small signal electrical equivalent circuit of a NEMS resonator structure. The resonator can be modeled as a typical Butterworth-Van Dyke equivalent circuit where $L_x$, $C_x$, and $R_x$ represent the motional inductance, capacitance and resistance respectively. $C_0$ is the parasitic DC capacitance of the resonator and $C_p$ represents the total parasitic capacitance introduced from the wirebonds, circuit board and packaging. If $C_0$ and $C_p$ are large, they will generate large amounts of current that will obscure the motional current of the resonator. The current from the input ($V_{in}$) to the output of the NEMS resonator has three main paths:

$$I_f = I_{co} + I_x + I_{cp} \quad \text{(Eq. 1)}$$

The admittance of the NEMS resonator is given by the following equation:

$$Y = SC_0 + \frac{SC_X}{S^2 L_X C_X + SR_X C_X + 1} + SC_p \quad \text{(Eq. 2)}$$

Figure 2:
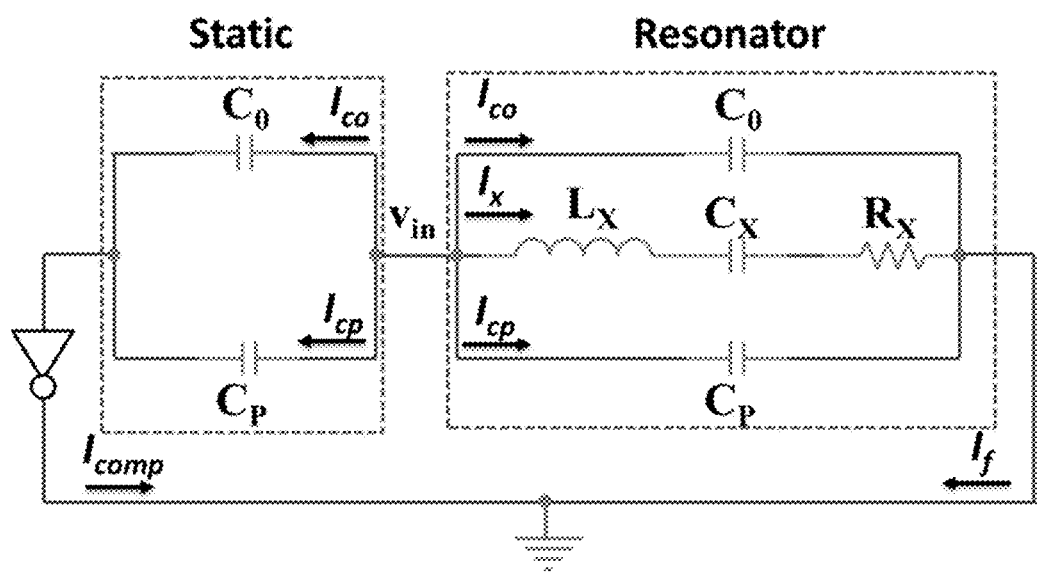
FIG. 2 is schematic representation of a circuit depicting parallel connection of a compensation capacitor (Static) to a resonator, resulting in parasitic feedthrough self-cancelation, in accordance with an embodiment.

From Equation 2, if the feedback capacitor $C_0$ and parasitic capacitor $C_p$ increases, their effective impedance decreases and would sink most of the input current thus masking the motional current $I_x$ which is the parameter of interest. To minimize the effect of $C_0$ and $C_p$, either an on-board or off-board compensating capacitor can be added in parallel to cancel their effect. FIG. 2 illustrates the parallel connection of the compensation capacitor (Static) to the resonator. The compensation capacitor is fixed to the substrate so does not generate motional current. The current from the Static structure ($I_{co}+I_{cp}$) is inverted into $I_{comp}$. $I_{comp}$ is electrically combined with the current from the resonator $I_f$. $I_{Total}$ is fed into an off board transimpedance amplifier.

$$I_{comp} = -(I_{co} + I_{cp}) \quad \text{(Eq. 3)}$$

$$I_{Total} = I_f + I_{comp} = I_x \quad \text{(Eq. 4)}$$

Figure 3:
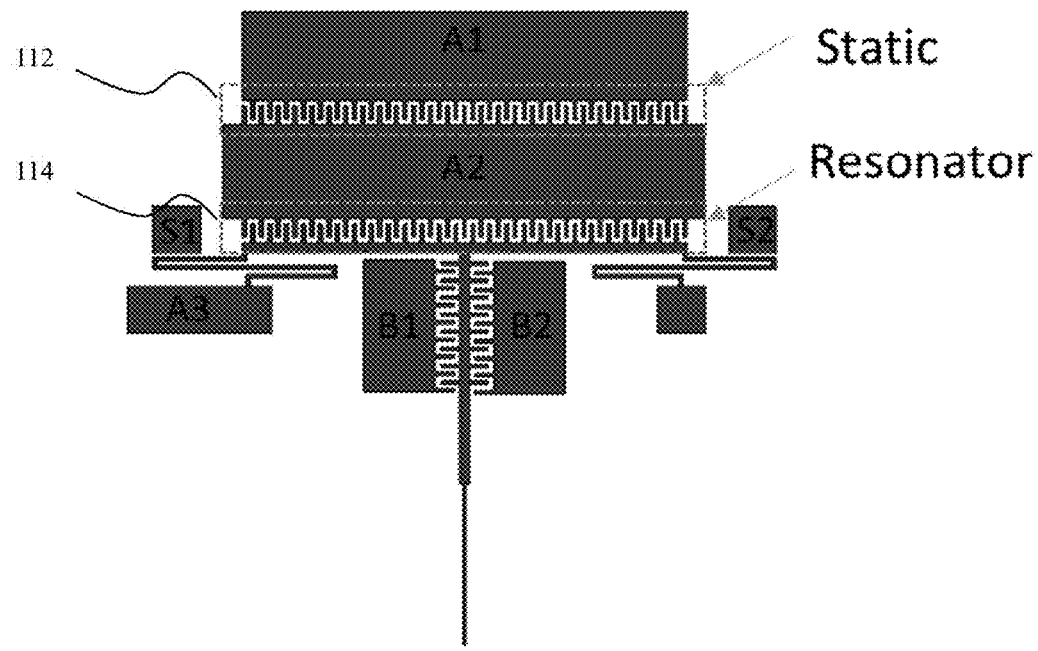
FIG. 3 is a schematic representation of a MiT probe with a compensation device structured identically to the resonator, in accordance with an embodiment.

The compensation device is structurally identical to the resonator as shown in FIG. 3. The comb-drives that form the static component 112 in FIG. 3 are fixed where as those that form the resonator component 114 are fully released from the substrate and capable of vibrating. Both AC and DC voltages are applied to electrode A2. The parasitic current ($I_{co}+I_{cp}$) through the static component is inverted by on-board inverter into $I_{comp}$ which is then combined with the resonator current $I_f$. The combined current is fed into a transimpedance amplifier. The probe tip device depicted in FIG. 3 has both a static component 112 and a resonating component 114. The static structures are fixed on the substrate whereas the resonating structures are free to mechanically move and can be excited in a vibrational mode.

Figure 4:
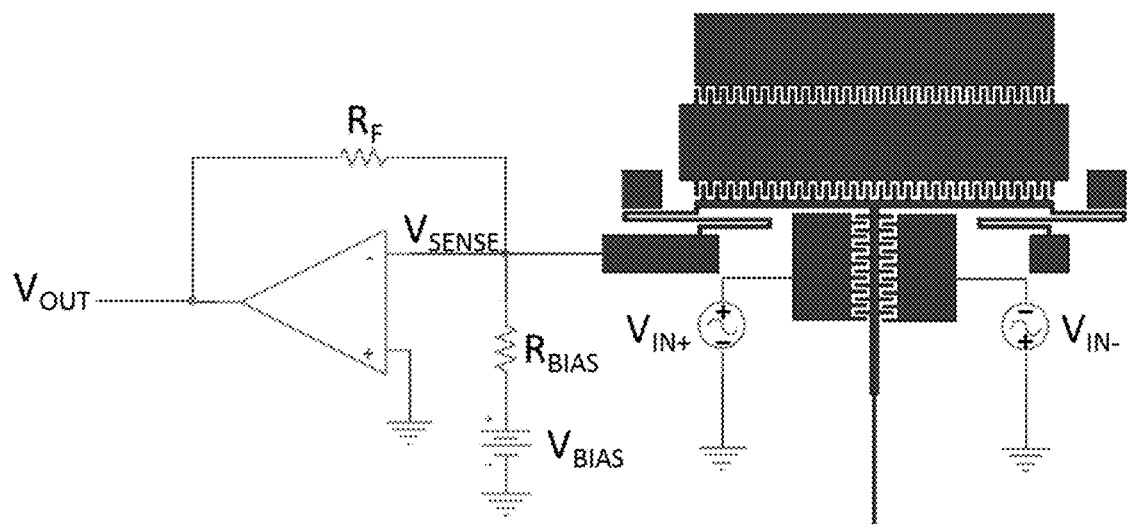
FIG. 4 is a schematic representation of a MiT probe with on-chip feedthrough cancellation using monolithically integrated static and resonating structures, in accordance with an embodiment.

The probe tip can be used to image surfaces in both AFM and Scanning Tunneling Microscopy (STM) modes. In contact mode AFM, the tip is dragged across the surface of a sample. As the tip encounters different roughness of the surface, since the tip is supported by springs, it moves up and down. This up and down movement of the tip can be sensed by the differential capacitors B1 and B2. The device is biased as shown in FIG. 4, where AC voltages are applied to B1 and B2 and DC voltage applied to the probe tip. STM images can also be acquired with the biased probe tip.

$V_{SENSE}$ changes with the displacement of the probe tip and its value can be used to create a 3D topographical image of the surface. For small probe tip displacement the following equation is utilized:

$$V_{SENSE} = V_{IN}\left(\frac{y}{y_0}\right) \quad \text{(Eq. 5)}$$

where y is a small displacement caused by the probe tip in contact with a surface and $y_0$ is the default smallest gap between any of the fingers on B1 or B2 and a probe tip finger.

Example 1—Fabrication of All-Metal Probe Tips with Differential Sensing Capacitors and Feedback Cancellation Structure To ensure that there is good ohmics between the probe tip and the sample, the workfunction of the probe tip and sample should be closely matched. In most semiconductor technology nodes, tungsten plugs are used to connect a metal to the source, drain, and gate regions of the transistor. To probe these plugs, tungsten probe tips are usually used due to its hardness and high conductivity. But the tungsten probes are susceptible to oxidation which in effect render them insulating and non-ideal for electrical probing. Both chemical and mechanical techniques are used to remove the oxide on the probe tip.

Figure 5:
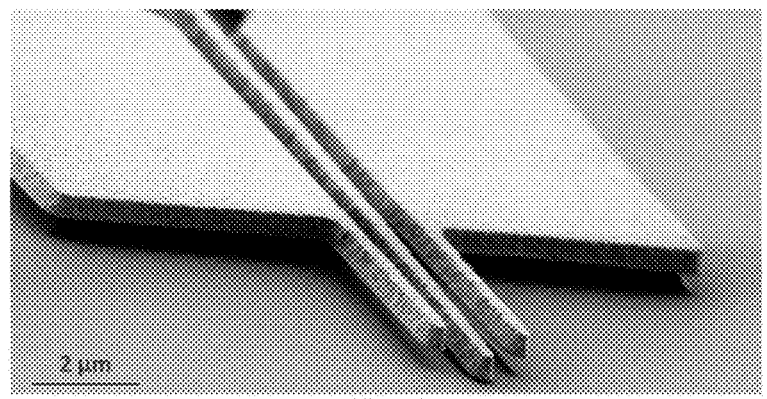
FIG. 5 is a SEM scanning electron microscope (SEM) image of a MiT probe with gold probe tips, in accordance with an embodiment.
Figure 6:
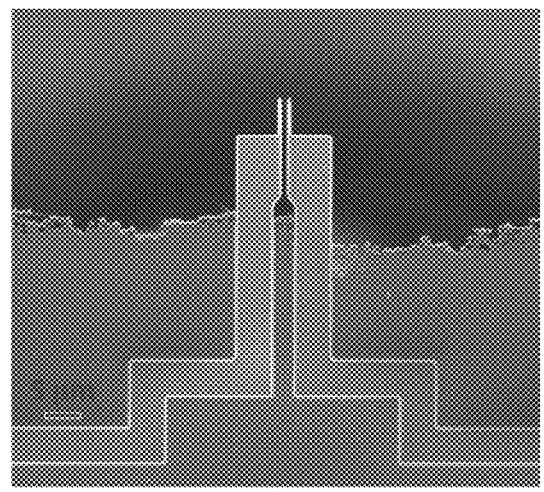
FIG. 6 is a SEM image of a MiT probe with $MoSi_2$ probe tips, in accordance with an embodiment.
Figure 7:
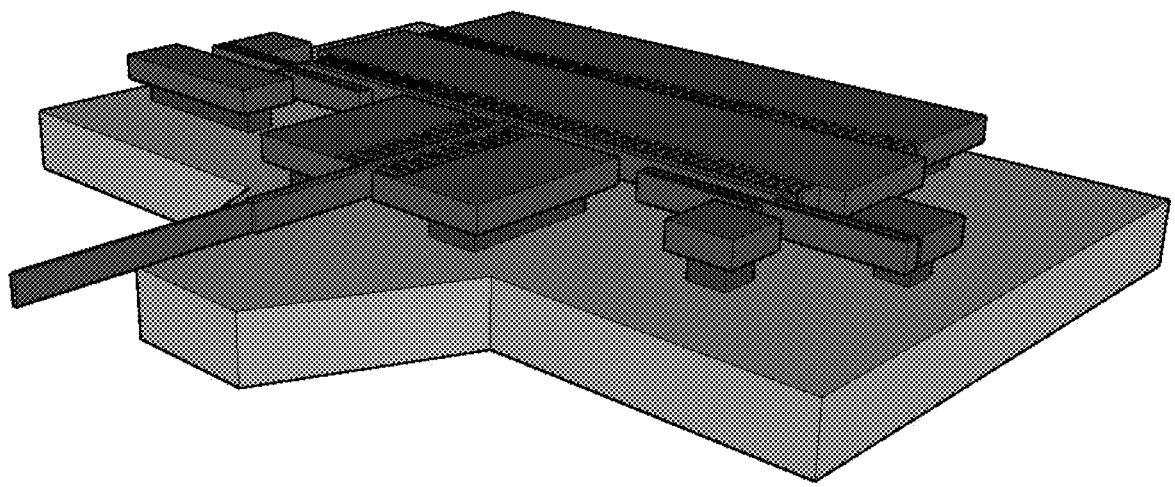
FIG. 7 is a schematic representation of a MiT probe, in accordance with an embodiment.

Other structures with different workfunctions would require different conducting probe tip materials. Platinum and gold are metals of interest for nanoprobing due to their high conductivity and non-oxidation tendencies. Gold is pretty soft and might stick to surfaces. To this end, probe tip devices with different conducting materials or metals have been fabricated as shown in the SEM image in FIGS. 5 and 6. Table 1, in accordance with an embodiment, provides a method for the nanofabrication of an all-metal integrated probe tip device. Referring to FIG. 7 is an image of the finalized probe device according to the method of Table 1.

TABLE 1

Method for Nanofabrication of All-Metal Integrated Probe Tip Device

| Step # | Process |
|---|---|
| 100 | A Double Sided Polished (DSP) silicon wafer is provided. |
| 102 | SiO$_2$ is deposited via Plasma Enhanced Chemical Vapor Deposition (PECVD) on both the front side and backside of the wafer. Approximately 2 μm of SiO$_2$ is deposited, although other amounts are possible. |

TABLE 1-continued

Method for Nanofabrication of All-Metal Integrated Probe Tip Device

| Step # | Process |
|---|---|
| 104 | Chromium is sputtered as an adhesion layer, followed by sputtering a metal of choice, including but not limited to gold, MoSi$_2$, Pt, and other metals. |
| 106 | The photoresist is then spun, patterned, and developed. |
| 108 | The metal is dry etched with, for example, either ion mill or Cl$_2$ chemistry. |
| 110 | Strip resist. |
| 112 | Spin resist on backside of wafer and pattern it, and then develop the resist. |
| 114 | Use the resist as an etch mask to etch the backside SiO$_2$ layer. |
| 116 | Use the backside SiO$_2$ layer as an etch mask to etch the bulk Si wafer to the front side oxide layer. |
| 118 | Use either vapor Hydrofluoric Acid (HF) or Buffered Oxide Etch (BOE) to etch both the front side and backside SiO$_2$ layers. The probe device is fully released at this stage. |

Example 2—Fabrication of Probe Tip Device with Metal Overhang, Parasitic Feedthrough Self-Cancelation and Differential Sensing Capacitors The stress gradient in the metal films might bend the probe tip either upwards or downward. To mitigate the effect of stress gradient, the metal can be mechanically attached to a supporting material.

Figure 8:
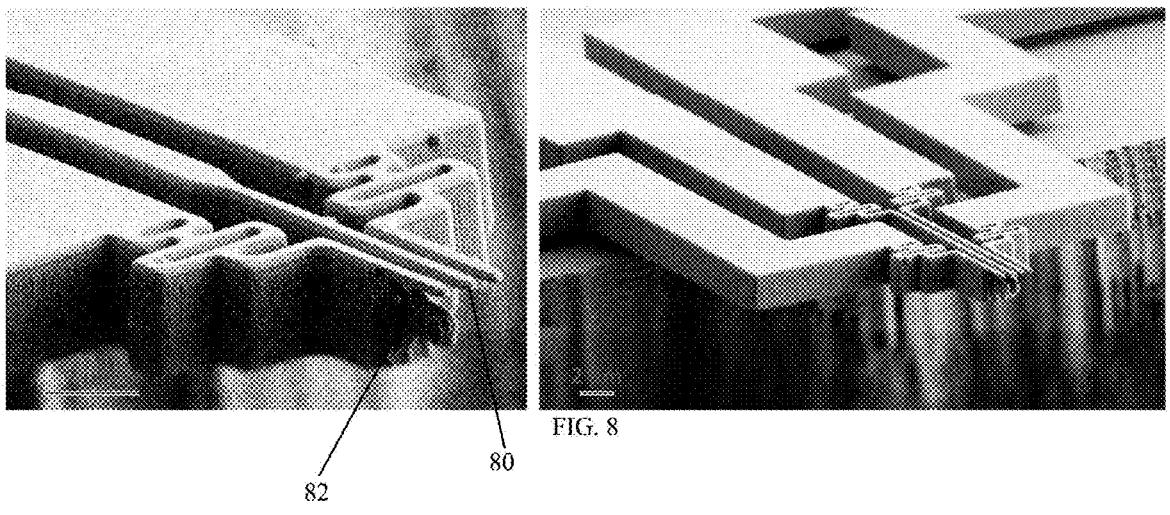
FIG. 8 is a SEM image of a MiT probe with a platinum metal layer that sits on a silicon supporting structure, in accordance with an embodiment.
Figure 9:
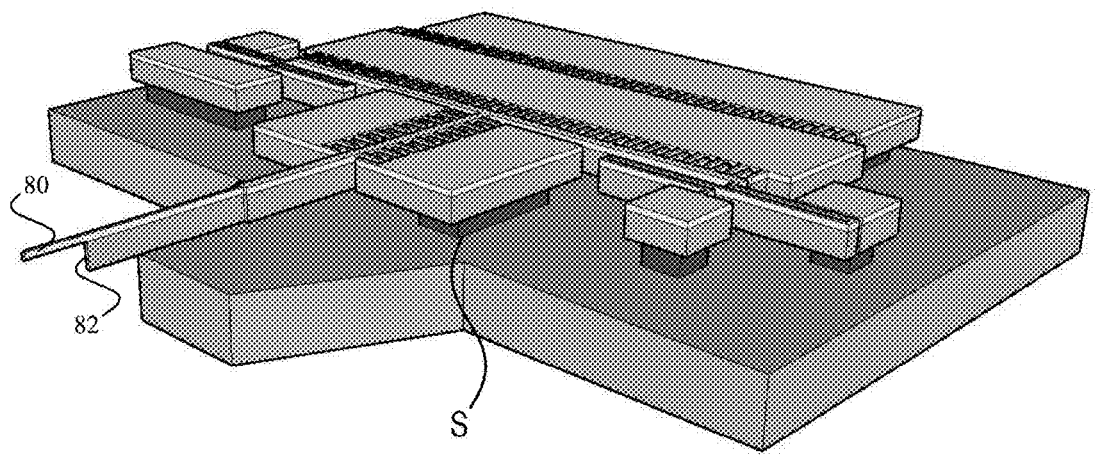
FIG. 9 is a schematic representation of a MiT probe, in accordance with an embodiment.
Figure 10:
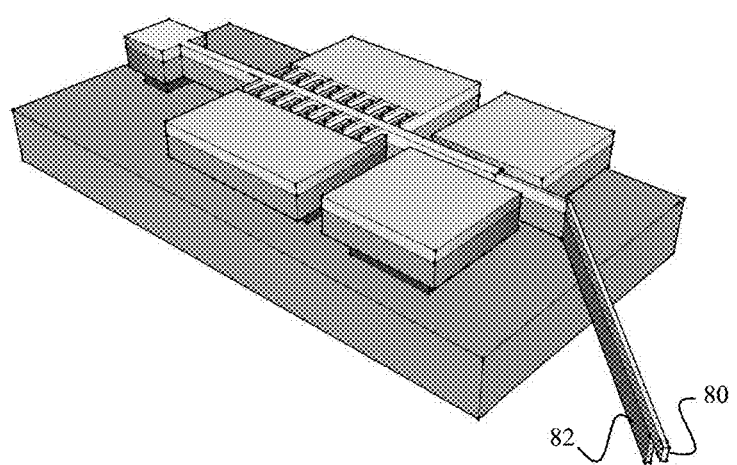
FIG. 10 is a schematic representation of a MiT probe, in accordance with an embodiment.

According to an embodiment, FIGS. 8, 9, and 10, for example, show a metal terminal probe end 80 of a probe tip which sits on, is supported by, or is affixed to, a silicon supporting layer 82. The metal probe tip 80 extends past the silicon support layer 82 and during AFM/STM imaging and nanoprobing, only the metal probe tip 80 is in contact with the sample. The metal of choice is not limited to platinum, but gold and other conductive materials can also be utilized. Also, various materials such as silicon dioxide, silicon nitride can be used for the structural support layer. As illustrated in FIG. 9, silicon support layer 82 is in contact with at least one spacer S arranged to lift silicon support layer 82 off of the substrate creating a visible air-gap. The platinum tip can be used for both AFM/STM imaging and nanoprobing. An embodiment of the nanofabrication method for the metal-overhang probe tip is outlined in Table 2.

The support layer for the metal is not limited to silicon but other materials such as silicon dioxide, silicon nitride, and MoSi$_2$, among others. Two or more individual probe tips can be synchronously and simultaneously used to perform AFM or STM imaging of a sample. Using the acquired image, individual tips can be navigated to specific points on the sample. For example, the plugs in an Integrated Circuit (IC) can be nanoprobed using the device, where all the four individual probe tips are scanned simultaneously to acquire STM or AFM image and subsequently navigated to specific plugs for nanoprobing. The 3D image can then be used as feedback for positioning each tip at a particular point on the sample.

According to an embodiment using the fabrication process outlined in Table 2 above, curved probe tips can be realized as shown in FIG. 10. These tips could have integrated deflection electrodes that can actuate and sense the probe tip in resonance as well as integrated differential capacitive sensors for sensing the motion of the probe tip device. Two or more of these curved tips can be synchronized and used to perform Atomic Force Probing of a device.

According to an embodiment using the fabrication process outlined in Table 2, predefined shaped single tips with extended metal overhangs can be realized. These probe tips can be used as fabricated, or soldered to metal shank, and

TABLE 2

Method for Nanofabrication of a Probe Device with an Extended Conductive Material/Metal Over-Hang

| Step # | Process |
|---|---|
| 200 | A Double Sided Polished (DSP) silicon wafer is provided. |
| 202 | Perform PECVD deposition of 2 μm SiO$_2$ on the handle layer (back side of SOI wafer). |
| 204 | Sputter chromium, such as a few nanometers, as an adhesion layer followed by the sputtering of metal, such as platinum (Pt) on the front side of wafer. |
| 206 | Spin negative tone photoresist on the Pt layer. |
| 208 | Lithographically pattern the probe tip device, and then develop the resist. |
| 210 | Ion mill the Pt and Cr layers, then use Deep Reactive Ion Etching (DRIE) to etch the Si device layer. |
| 212 | Strip the photoresist. |
| 214 | Process the SOI handle layer by patterning the oxide etch mask. Spin resist, pattern, and develop. |
| 216 | Use CHF$_3$/O$_2$ chemistry to dry etch the oxide layer. |
| 218 | Spin positive tone resist on the SOI device layer. |
| 220 | Expose a few μm or nm of the tip of the probe. |
| 222 | Etching the silicon material below the exposed Pt layer. |
| 224 | Strip the resist. |
| 226 | Use the SiO$_2$ layer as an etch masks to DRIE the handle layer and terminate on the BOX. |
| 228 | Use either vapor HF or Buffered Oxide Etch (BOE) to etch the SiO$_2$ backside etch mask and BOX. The probe device is fully released at this stage. | inserted into manipulators. If the SOI device layer is thick, then the buried oxide layer can be fully etched away to release probe tips.

Figure 11:
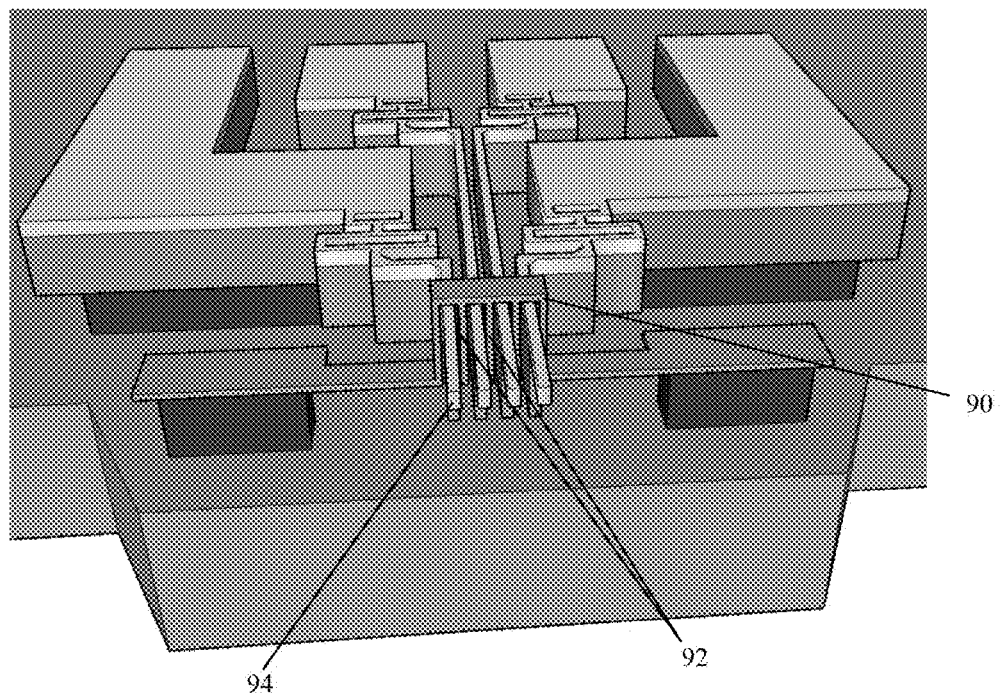
FIG. 11 is a schematic representation of a MiT probe, in accordance with an embodiment.

Example 3—Fabrication of Monolithically Integrated Probe Tips with Interdigitated Structures Between Two or More Probe Tips Freely released and suspended multiple integrated tips tend to pull-in to each other after the release process or during nanoprobing. To mitigate the pull-in effect, interdigitated structures can be monolithically inserted between the probes. Table 3 below illustrates the fabrication process for monolithically implementing the interdigitated structures, in accordance with an embodiment. Referring to FIG. 11 is an image of the finalized probe device according to the method of Table 3. In FIG. 11, for example, the probe includes a structure 90 with interdigitated structures 92 positioned between and on the outer side of the probe tips 94.

TABLE 1

Method for Implementing Monolithically Interdigitated Structures Between Probe Tips.

| Step # | Process |
| --- | --- |
| 300 | Start with an SOI wafer. 2 μm device layer and 2 μm buried oxide (BOX) layer. |
| 302 | PECVD deposition of 2 μm $SiO_2$ on the handle layer (backside of SOI wafer). |
| 304 | Sputter a few nanometers of Cr as an adhesion layer followed by sputtering a metal of choice, such as gold, $MoSi_2$, Pt, and others. |
| 306 | Spin negative tone photoresist on the metal layer. |
| 308 | Lithographically pattern the probe tip device. Develop the resist. |
| 310 | Ion mill the Pt and Cr layers. Then use DRIE to etch the Si device layer. |
| 312 | Strip the photoresist. |
| 314 | Process the SOI handle layer by patterning the $SiO_2$ etch mask. Spin resist, pattern and develop. |
| 316 | Use $CHF_3/O_2$ chemistry to dry etch the oxide layer. Strip the resist. |
| 318 | Deposit a few nanometers of conformal $SiO_2$ by Atomic Layer Deposition (ALD). Then deposit another layer of conformal undoped Si (polysilicon or amorphous). Spray coat photoresist, pattern and etch undoped Si and $SiO_2$ layers. The probes tips are sandwiched in $SiO_2$ and Si interdigitated structures. |
| 320 | Spray coat photoresist on the SOI device layer. |
| 322 | Expose a few μm or nm of the tip of the probe device. |
| 324 | Etch the silicon material below the exposed Pt layer. |
| 326 | Strip the resist. |
| 328 | Use the $SiO_2$ layer as an etch masks to DRIE the handle layer and terminate on the BOX. |
| 330 | Use either vapor HF or Buffered Oxide Etch (BOE) to etch the $SiO_2$ etch mask and BOX layer. The $SiO_2$ layers surrounding the interdigitated structures are also removed with vapor HF or BOE. The probe device is fully released at this stage. |

The 4-tip MiT probe can be considered as a Ground-Signal-Ground Signal (GSGS) probe device where two signals that are out-of-phase can be introduced on the Signal probes and shielded by the Ground probes. Bottom electrodes can also be placed below each probe tip for controlled downward deflection of each probe tip. The tips can be used for conventional 4-point probing. Also, the 4 probes can be scanned across a sample surface and the current between any of the two tips can be used for imaging the surface.

Figure 12:
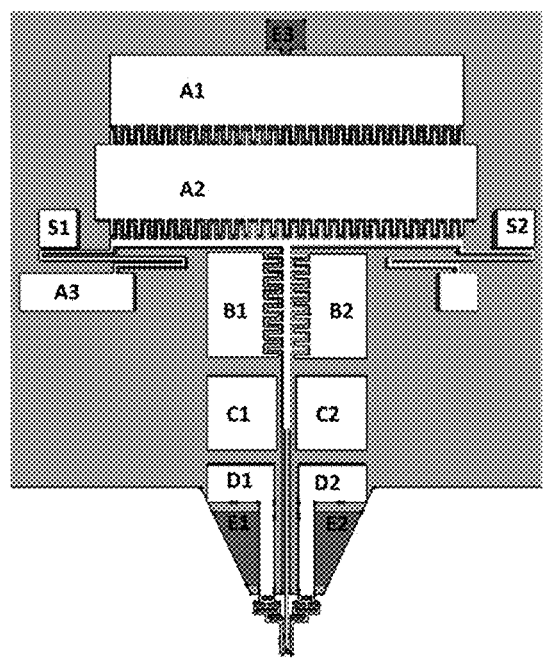
FIG. 12 is a top view schematic of a MiT probe with three degrees of freedom, in accordance with an embodiment.
Figure 13:
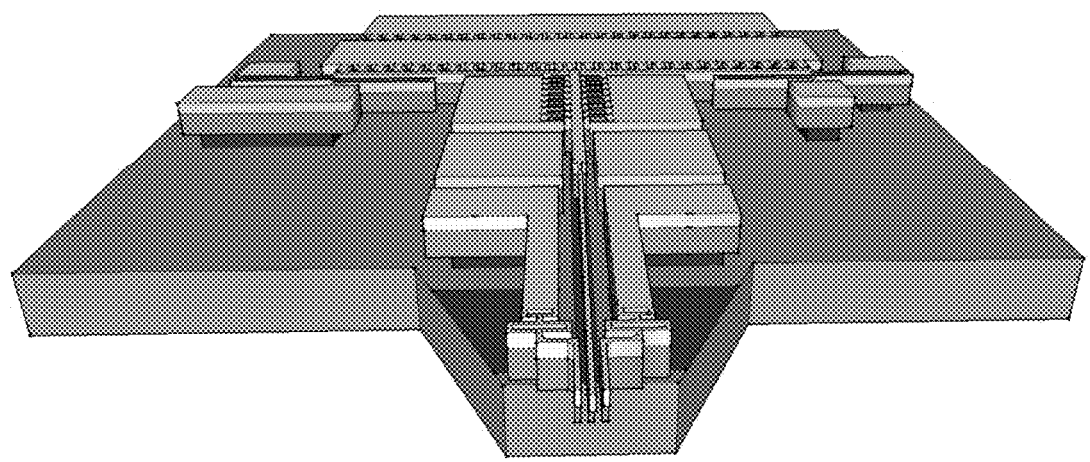
FIG. 13 is a schematic representation of a MiT probe, in accordance with an embodiment.

Example 4—Fabrication of Monolithically Integrated Probe Tips with Bottom Actuation Electrodes Certain STM/AFM imaging and nanoprobing require that probe tips exhibit 3 Degrees of Freedom (DOF). FIG. 12 is the top view of a monolithically integrated tips device with 3 DOF. Applied voltages to electrode A2 move the middle probe tip in-plane whereas applied voltages to electrodes C1 or C2 laterally deflects the middle probe tip. Electrode E3 runs below the middle probe tip and applied voltages to E3 bends down the middle probe tip towards the substrate. The side probe tips also have electrodes E1 and E2 that bend down the tips when actuated. Table 4 illustrates the fabrication of MiT probe with 3 DOF where the bottom electrodes (E1, E2 and E3) are used to deflect the probe tips out of plane. Referring to FIG. 13 is an image of the finalized probe device according to the method of Table 4.

TABLE 4

Fabrication of MiT Probe With 3 DOF.

| Step # | Process |
| --- | --- |
| 400 | Start with undoped Double Sided Polished (DSP) silicon wafer. |
| 402 | Deposit 2 μm of PECVD $SiO_2$ on one side of the DSP polished wafer. |
| 404 | Pattern the $SiO_2$ layer with photoresist then etch the $SiO_2$ layer. |
| 406 | Strip the photoresist |
| 408 | Spin resist on frontside of the wafer. |
| 410 | Pattern the bottom actuation electrodes. |
| 412 | Using the resist as an etch mask, etch about 500 nm into the silicon wafer. Strip resist. |
| 414 | Sputter about 1 μm of 1$^{st}$ metal layer to fill-in the etched trenches. |
| 416 | Perform Chemical Mechanical Polishing (CMP) to planarize the wafer surface. The bottom electrodes are embedded into the silicon wafer. |

TABLE 4-continued

Fabrication of MiT Probe With 3 DOF.

| Step # | Process |
|---|---|
| 418 | Deposit 2 μm of PECVD $SiO_2$ on the frontside of the wafer. |
| 420 | Deposit highly doped polysilicon, amorphous silicon or $MoSi_2$ onto the frontside $SiO_2$ layer. |
| 422 | Sputter a few nanometers of Cr to serve as adhesion layer followed by sputtering of $2^{nd}$ metal layer. |
| 424 | Spin resist, pattern, and develop the photoresist. Ion mill the Cr and $2^{nd}$ metal layer and use DRIE to etch the polysilicon layer. |
| 426 | Strip resist. |
| 428 | Spray resist and pattern a region to expose the tips. |
| 430 | Etch the silicon material below the exposed Pt layer. |
| 432 | Strip resist. |
| 434 | Process the backside of the wafer by DRIE the wafer using the backside $SiO_2$ layer. |
| 436 | Use either vapor HF or Buffered Oxide Etch (BOE) to etch both the frontside and backside $SiO_2$ layers. The probe device is fully released at this stage. |

Figure 14:
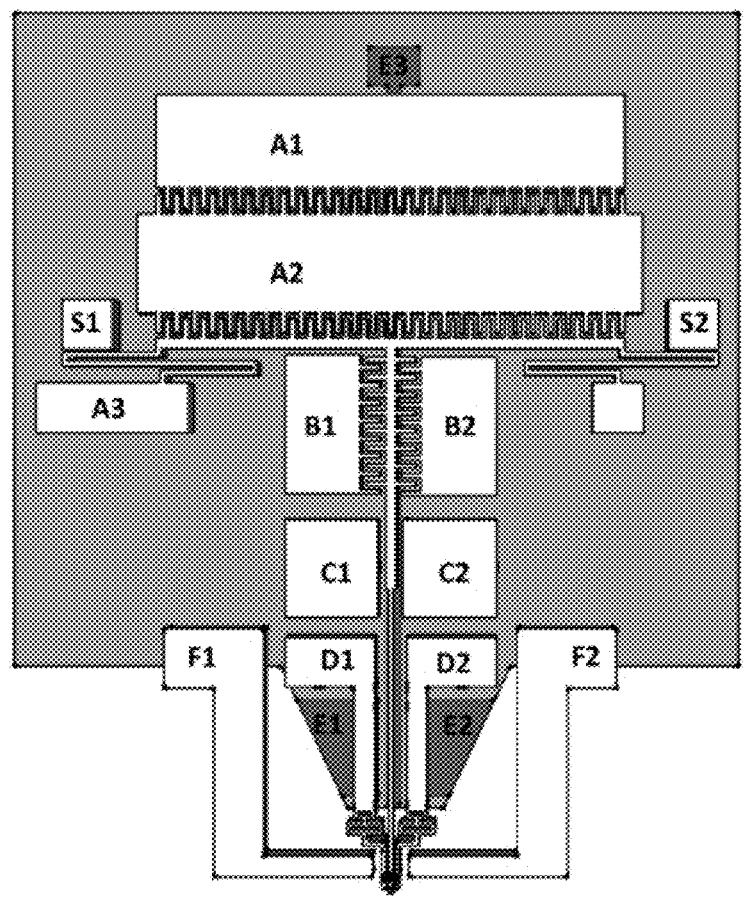
FIG. 14 is a top view schematic representation of a MiT probe with three degrees of freedom, in accordance with an embodiment.
Figure 15:
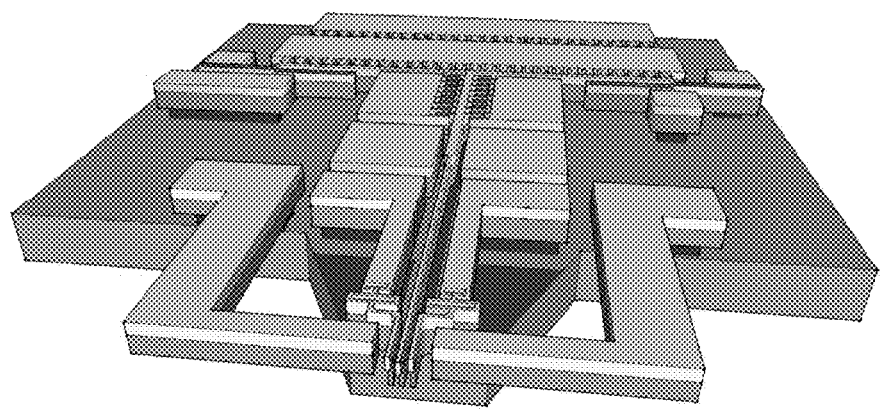
FIG. 15 is a schematic representation of a MiT probe, in accordance with an embodiment.

The bottom electrodes are used to deflect the probes out-of-plane. The metal choice for the actuation electrodes ($1^{st}$ metal layer) and the probe tips ($2^{nd}$ metal layer) could be the same or different. The 3-Tip MiT probe configuration allows these probes to be used as Ground-Signal-Ground (GSG) RF/microwave probes for testing microwave and RF circuits. The 3-Tip MiT probe can also be used for AFP. Using the fabrication process outlined in Table 4 above, a 5-point probe device can be realized. The middle probe tip is used for AFM/STM imaging then it is retracted and the remaining 4 probe tips are used for conventional 4-point probe measurements.

tion electrodes, where the side tips are laterally deflected. The side probe tips can be independently controlled by applying voltages to electrodes E1 and E2 (bottom electrodes) and F1 and F2 (side electrodes) as shown in FIG. 14. Illustrated in Table 5 below is the fabrication of an MiT probe with 3 DOF where the bottom electrodes (E1, E2 and E3) are used to deflect the probe tips out-of-plane. F1 and F2 are independently used to laterally deflect the side tips. Referring to FIG. 15 is an image of the finalized probe device according to the method of Table 5.

TABLE 5

Fabrication of MiT Probe with 3 DOF and Side Actuation Electrodes.

| Step # | Process |
|---|---|
| 500 | Start with undoped DSP silicon wafer. |
| 502 | Deposit 2 μm of PECVD $SiO_2$ on one side of the DSP polished wafer. |
| 504 | Pattern the $SiO_2$ layer with photoresist then etch the $SiO_2$ layer. |
| 506 | Strip the photoresist. |
| 508 | Spin resist on frontside of the wafer. |
| 510 | Pattern the bottom actuation electrodes. |
| 512 | Using the resist as an etch mask, etch about 500 nm into the silicon wafer. Strip resist. |
| 514 | Sputter about 1 μm of $1^{st}$ metal layer to fill-in the etched trenches. |
| 516 | Perform CMP to planarize the wafer surface. The bottom electrodes are embedded into the silicon wafer. |
| 518 | Deposit 2 μm of PECVD $SiO_2$ on the frontside of the wafer. |
| 520 | Deposit highly doped polysilicon, amorphous silicon or $MoSi_2$ onto the frontside $SiO_2$ layer. |
| 522 | Sputter a few nanometers of Cr to serve as adhesion layer followed by sputtering of $2^{nd}$ metal layer. |
| 524 | Spin resist, pattern, and develop the photoresist. Ion mill the Cr and $2^{nd}$ metal layer and use DRIE to etch the polysilicon layer. |
| 526 | Strip resist. |
| 528 | Spray coat resist and pattern a region to expose the tips. |
| 530 | Etch the silicon material below the exposed Pt layer. |
| 532 | Strip resist. |
| 534 | Process the backside of the wafer by DRIE the wafer using the backside $SiO_2$ layer. |
| 536 | Use either vapor HF or Buffered Oxide Etch (BOE) to etch both the frontside and backside $SiO_2$ layers. The probe device is fully released at this stage. |

Figure 16:
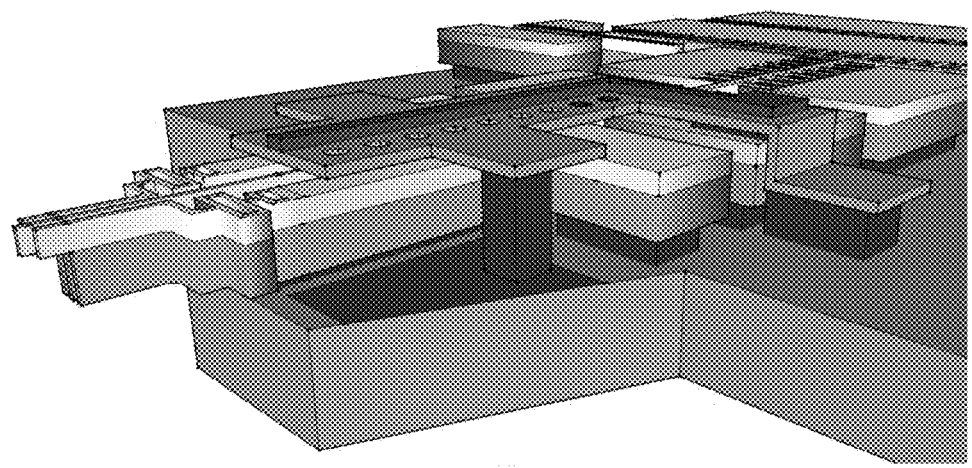
FIG. 16 is a schematic representation of a MiT probe, in accordance with an embodiment.

Example 5—Fabrication of Monolithically Integrated Probe Tips with Bottom and Side Actuation Electrodes According to an embodiment is the fabrication of monolithically integrated probe tips with bottom and side actua- Example 6—Fabrication of Monolithically Integrated Probe Tips with Top and Bottom Actuation Electrodes In certain applications, the middle probe tip might be required to be deflected both down (towards the substrate) and up (away from the substrate). Table 6 illustrates the fabrication process steps in realizing such a device. The metal choice for the actuation electrodes (1$^{st}$ metal) and the probe tips (2$^{nd}$ metal) could be the same or different. Referring to FIG. 16 is an image of the finalized probe device according to the method of Table 6, where the middle probe tip can deflect both up and down with respect to the substrate.

process for the vertically stacked MiT probes. The metal choice used in the MiT probe stack could be the same (1$^{st}$ metal is the same as 2$^{nd}$ metal) or different (1$^{st}$ metal is different from 2$^{nd}$ metal). The MiT probe stack is not limited to two layers but several layers can also be implemented using the outlined fabrication process flow. The stacked MiT probes can also be realized in standard CMOS processes

TABLE 6

Fabrication Process for Making MiT Probe with 3 DOF.

| Step # | Process |
|---|---|
| 600 | Start with an undoped DSP silicon wafer. |
| 602 | Deposit 2 μm of PECVD SiO$_2$ on one side of the DSP polished wafer. |
| 604 | Pattern the SiO$_2$ layer with photoresist then etch the SiO$_2$ layer. |
| 606 | Strip the photoresist |
| 608 | Spin resist on frontside of the wafer. |
| 610 | Pattern the bottom actuation electrodes. |
| 612 | Using the resist as an etch mask, etch about 500 nm into the silicon wafer. Strip resist. |
| 614 | Sputter about 1 μm of 1$^{st}$ metal to fill-in the etched trenches. |
| 616 | Perform CMP to planarize the wafer surface. The bottom electrode is embedded into the silicon wafer. |
| 618 | Deposit 2 μm of PECVD SiO$_2$ on the frontside of the wafer. |
| 620 | Deposit highly doped polysilicon, amorphous silicon or MoSi$_2$ onto the frontside SiO$_2$ layer. |
| 622 | Sputter a few nanometers of Cr to serve as adhesion layer followed by sputtering of 2$^{nd}$ metal. |
| 624 | Spin resist, pattern, and develop the photoresist. Ion mill the Cr and 2$^{nd}$ metal layer and use DRIE to etch the polysilicon layer. |
| 626 | Strip resist |
| 628 | Deposit PECVD SiO$_2$ and planarize by CMP. Next, deposit undoped polysilicon or undoped amorphous silicon. Spin resist and pattern the silicon top bridge. Etch the pattern into the undoped polysilicon or amorphous silicon layer. Strip resist. |
| 630 | Sputter top metal layer. Spin resist and pattern the top metal layer. Use the resist as an etch mask and use the ion mill to etch the metal layer. |
| 632 | Spin and pattern the photoresist. |
| 634 | Pattern the resist and etch the SiO$_2$ layer to expose the probe tips. Etch the silicon material below the exposed Pt layer. |
| 636 | Strip resist. |
| 638 | Use the backside SiO$_2$ layer as DRIE etch mask to etch the wafer. |
| 640 | Use either vapor HF or Buffered Oxide Etch (BOE) to etch both the frontside and backside SiO$_2$ layers. The probe device is fully released at this stage. The top electrode is suspended above the middle probe tip. |

Figure 17:
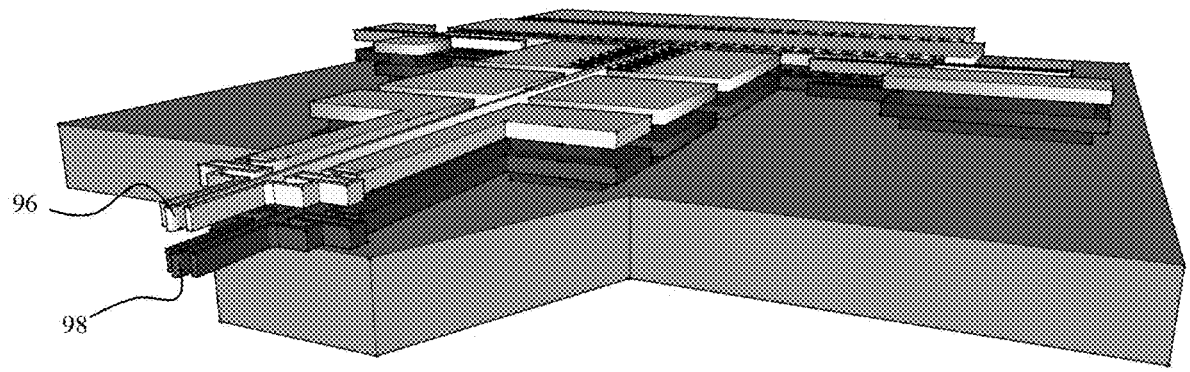
FIG. 17 is a schematic representation of a MiT probe, in accordance with an embodiment.

Example 7—Fabrication of Monolithically Integrated Self-Aligned Stacked Probe Devices Several MiT probes can be monolithically vertically integrated to offer several probe tips that can be used to probe structures on a wafer. Table 7 illustrates the fabrication where the different metal layers can be used as the probe tips. Referring to FIG. 17 is an image of the finalized probe device according to the method of Table 7. The finalized probe comprises a first probe set 96 and a second probe set 98, the first probe set being vertically stacked compared to the second probe set.

TABLE 7

Fabrication Process for Vertically Stacked Monolithically Integrated Probe Tip Devices.

| Step # | Process |
|---|---|
| 700 | Start with a DSP silicon wafer. |
| 702 | Deposit SiO$_2$ on both frontside and backside of wafer. |
| 704 | Pattern the SiO$_2$ layer with photoresist then etch the SiO$_2$ layer. |
| 706 | Strip the photoresist. |
| 708 | On the fronside of the wafer, sequentially deposit 1$^{st}$ metal, SiO$_2$ and 2$^{nd}$ metal layers. |
| 710 | Spin resist and pattern it. |
| 712 | Etch the 2$^{nd}$ metal, SiO$_2$ and 1$^{st}$ metal layers. |
| 714 | Strip the resist. |
| 716 | Use the backside SiO$_2$ layer as DRIE etch mask to etch the wafer. |
| 718 | Use either vapor HF or Buffered Oxide Etch (BOE) to etch both the frontside and backside SiO$_2$ layers. The probe device is fully released at this stage. |

Figure 18:
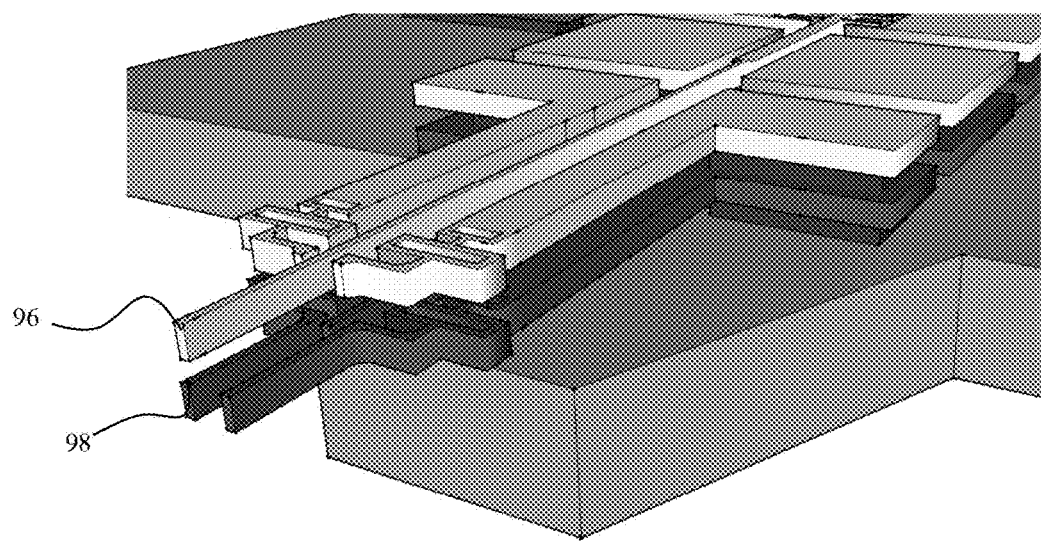
FIG. 18 is a schematic representation of a MiT probe, in accordance with an embodiment.

Example 8—Fabrication of Monolithically Integrated Fabrication of Monolithically Integrated Self-Aligned Stacked Probe Devices with Post Processed Probe Tip Configuration Self-Aligned Stacked Probe Devices Each MiT probe that makeup the vertically stacked monolithically integrated probe tip devices that was illustrated in Table 7 above have the same number of probe tips. In certain applications, a modified probe tip configuration might be required. In such situations, the FIB can be used to remove unneeded probe tips, as shown in Table 8. Removal of unneeded probe tips is not limited to the use of FIB but other means such as ion milling and reactive ion etching are possible. The metal choice used in the MiT probe stack could be the same ($1^{st}$ metal the same as $2^{nd}$ metal) or different ($1^{st}$ metal different from $2^{nd}$ metal). The MiT probe stack is not limited to two layers but several layers can also be implemented using the outlined fabrication process flow. Referring to FIG. 18 is an image of the finalized probe device according to the method of Table 8.

TABLE 8

Fabrication Process for Vertically Stacked Monolithically Integrated Probe Tip Devices with FIB-Modified Probe Tip Configuration.

| Step # | Process |
|---|---|
| 800 | Start with DSP silicon wafer. |
| 802 | Deposit $SiO_2$ on both frontside and backside of wafer. |
| 804 | Pattern the $SiO_2$ layer with photoresist then etch the $SiO_2$ layer. |
| 806 | Strip the photoresist. |
| 808 | On the frontside of the wafer, sequentially deposit $1^{st}$ metal, $SiO_2$ and $2^{nd}$ metal layers. |
| 810 | Spin resist and pattern it. |
| 812 | Etch the $2^{nd}$ metal, $SiO_2$ and $1^{st}$ metal layers. |
| 814 | Strip the resist. |
| 816 | From the backside of the wafer, etch the Si wafer and $SiO_2$ layer on both the backside and the exposed part of the frontside. |
| 818 | Use the FIB to mill part of the $1^{st}$ metal of the middle probe tip. |
| 820 | Use the FIB to mill part of the $2^{nd}$ metal of the side tips. |
| 822 | Use either vapor HF or Buffered Oxide Etch (BOE) to etch the frontside $SiO_2$ layers. The probe device is fully released at this stage. |

Figure 19:
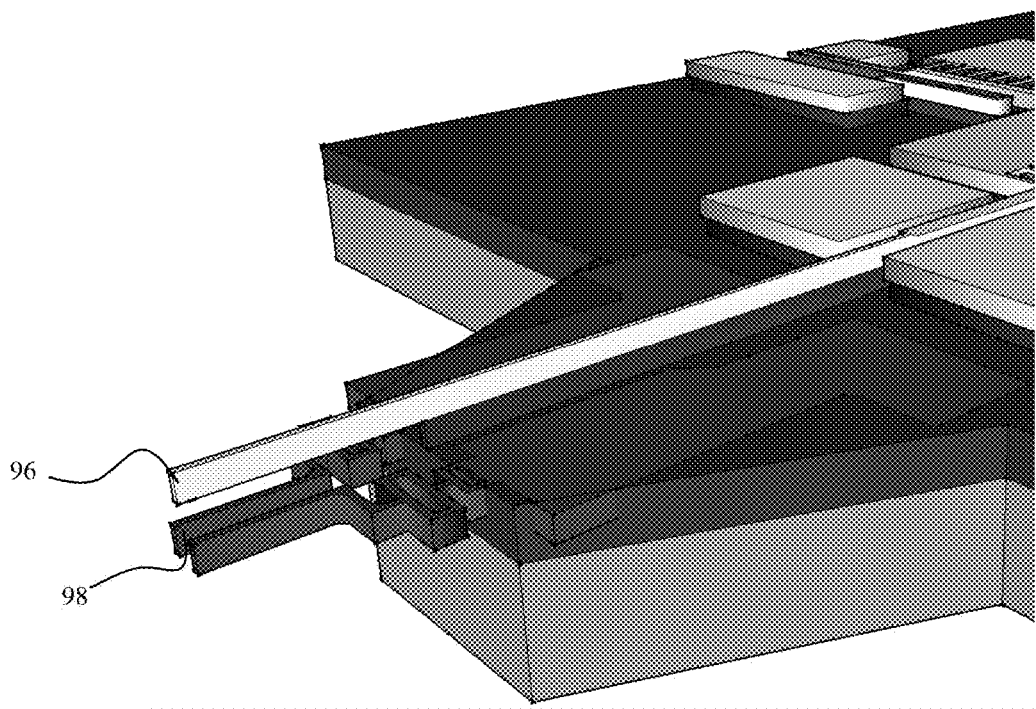
FIG. 19 is a schematic representation of a MiT probe, in accordance with an embodiment.

Example 9—Fabrication of Monolithically Integrated Out-of-Plane Probe Tip Device SRAM, DRAM and flash memory are typically arrayed and the plug spacing for the source, drain and gate are fixed. These plugs could be relatively easily accessed with MiT probes that have predefined tip configurations that directly address these specific plug layouts. The MiT probes can be designed specifically for a particular technology node and semiconductor foundry. The metal choice used for the probe tips in the MiT probe could be the same ($1^{st}$ metal the same as $2^{nd}$ metal) or different ($1^{st}$ metal different from $2^{nd}$ metal), as shown in Table 9. Referring to FIG. 19 is an image of the finalized probe device according to the method of Table 9.

TABLE 9

Fabrication Process for Out-of-Plane MiT Probe.

| Step # | Process |
|---|---|
| 900 | Start with a DSP silicon wafer. |
| 902 | Deposit $SiO_2$ on both sides of the wafer. |
| 904 | Spin photoresist and pattern the backside of the wafer. Etch the backside $SiO_2$ layer. |
| 906 | Strip the photoresist. |
| 908 | Spin photoresist on the frontside and pattern the side probe tips. Reactive Ion Etching (RIE) halfway into the $SiO_2$ layer and strip the photoresist. |
| 910 | Sputter the $1^{st}$ metal layer on the frontside of the wafer. |
| 912 | Perform Chemical Mechanical Polishing (CMP) to planarize the frontside of wafer. |
| 914 | On the frontside of the wafer, sequentially deposit another $SiO_2$ layer followed by sputtering a $2^{nd}$ metal layer. The $1^{st}$ and $2^{nd}$ metal layers could be the same or different metals. |
| 916 | Spin resist and pattern it. |
| 918 | Etch $2^{nd}$ metal layer and frontside $SiO_2$ layer. Strip photoresist. |
| 920 | Use the backside $SiO_2$ layer as an etch mask to DRIE the wafer to the frontside $SiO_2$ layer. |
| 922 | Dry etch both the backside and frontside $SiO_2$ layers. |
| 924 | The side probe tips are embedded in the $SiO_2$ layer while the middle probe tip sits on a $SiO_2$ support layer. |

Figure 20:
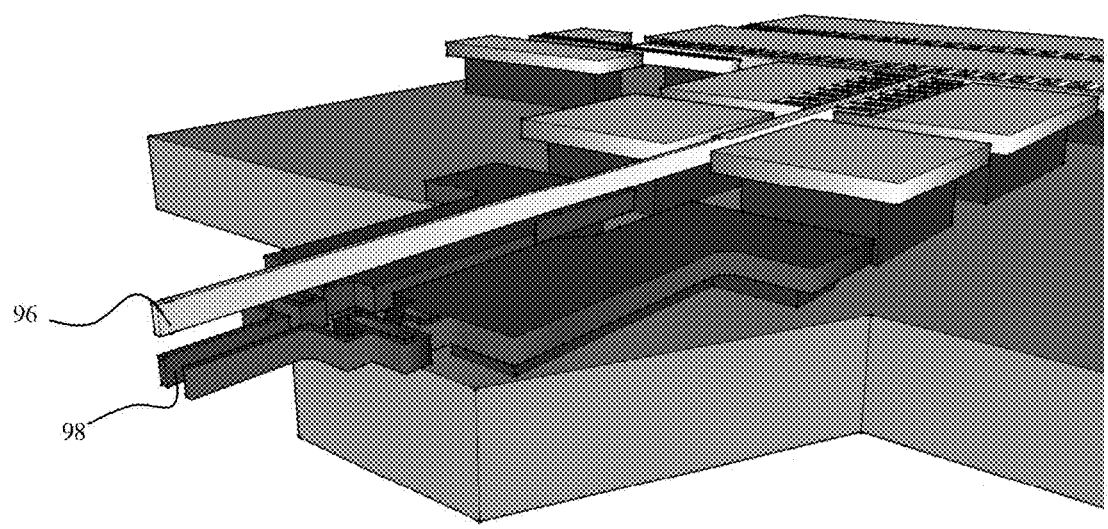
FIG. 20 is a schematic representation of a MiT probe, in accordance with an embodiment.

Example 10—Fabrication of Monolithically Integrated Freely Suspended Out-of-Plane Probe Tip Device The out-of-plane MiT probe that was illustrated in Table 9 above had the middle probe tip fixed to the $SiO_2$ support layer. Table 10 below details out the fabrication of a fully suspended and movable out-of-plane middle probe tip device. Referring to FIG. 20 is an image of the finalized probe according to the method of Table 10.

TABLE 10

Process for Making Monolithically Integrated Freely Suspended Out-of-Plane MiT Probe

| Step # | Process |
|---|---|
| 1000 | Start with DSP silicon wafer. |
| 1002 | Deposit $SiO_2$ on both sides of the wafer. |
| 1004 | Spin photoresist and pattern the backside of the wafer. Etch the backside $SiO_2$ layer. |
| 1006 | Strip the photoresist. |
| 1008 | Spin photoresist on the frontside and pattern the side probe tips. RIE halfway into the $SiO_2$ layer and strip the photoresist. |
| 1010 | Sputter the $1^{st}$ metal layer on the frontside of the wafer. |
| 1012 | Perform Chemical Mechanical Polishing (CMP) to planarize the frontside of wafer. |
| 1014 | On the frontside of the wafer, sequentially deposit another $SiO_2$ layer followed by sputtering a $2^{nd}$ metal layer. The $1^{st}$ and $2^{nd}$ metal layers could be the same or different metals. |
| 1016 | Spin resist and pattern it. |
| 1018 | Etch $2^{nd}$ metal layer and strip photoresist. |
| 1020 | Use the backside $SiO_2$ layer as an etch mask to DRIE the wafer to the frontside $SiO_2$ layer. |
| 1022 | Use either vapor HF or Buffered Oxide Etch (BOE) to etch both the frontside and backside $SiO_2$ layers. The probe device is fully released at this stage. |

According to an embodiment, various combinations of the different probe configurations (single tip, 2, 3 and/or 4-Tip MiT probes) can be simultaneously used to scan and nano-probe. According to one example, a 3-Tip MiT probe could be utilized to access the source, drain, gate plugs of a transistor then bringing in an independent single tip device to probe the bulk (body) of the transistor.

Fabrication of Monolithically Integrated Freely Suspended Out-of-Plane Probe Tip Device with Bottom and Side Actuation Electrodes.

Figure 21:
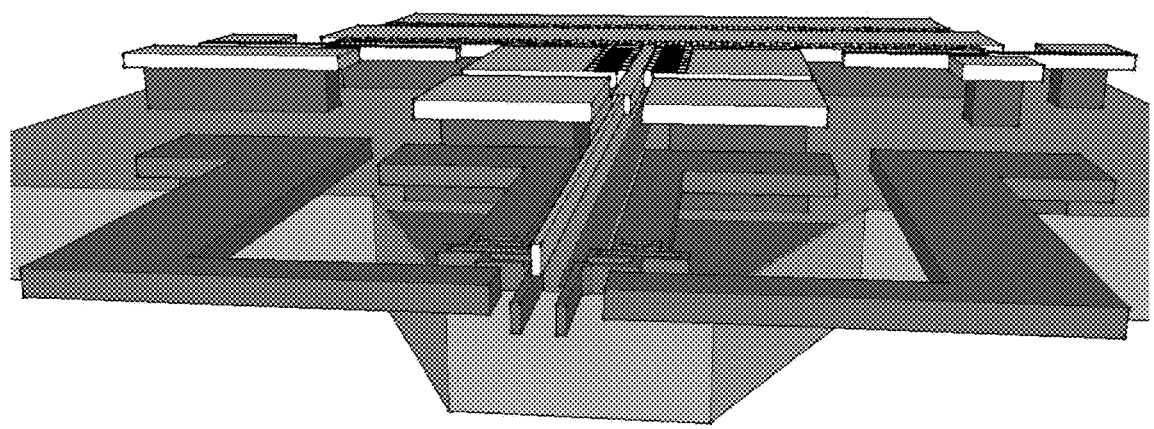
FIG. 21 is a schematic representation of a MiT probe, in accordance with an embodiment.

Bottom electrodes are used to deflect the probe tips up or down with respect to the substrate. But in certain applications, the side probe tips might need to be laterally deflected. For instance, when the gate length of two transistors varies, the side tips must be laterally deflected in order to access the source and drain plugs. Table 11 below illustrates the fabrication process flow for making MiT probes with side actuation electrodes. Referring to FIG. 21 is an image of the finalized probe device according to the method of Table 11.

TABLE 11

Fabrication Process Flow for Making Monolithically Integrated Freely Suspended Out-of-Plane MiT Probe with Side and Bottom Actuation Electrodes.

| Step # | Process |
|---|---|
| 1100 | Start with undoped DSP silicon wafer. |
| 1102 | Deposit 2 μm of PECVD $SiO_2$ on one side of the DSP polished wafer. |
| 1104 | Pattern the $SiO_2$ layer with photoresist then etch the $SiO_2$ layer. |
| 1106 | Strip the photoresist |
| 1108 | Spin resist on frontside of the wafer. |
| 1110 | Pattern the bottom actuation electrodes. |
| 1112 | Using the resist as an etch mask, etch about 500 nm into the silicon wafer. Strip resist. |
| 1114 | Sputter about 1 μm of $1^{st}$ metal layer to fill-in the etched trenches. |
| 1116 | Perform Chemical Mechanical Polishing (CMP) to planarize the wafer surface. The bottom electrodes are embedded into the silicon wafer. |
| 1118 | Spin photoresist on the frontside and pattern the side probe tips. RIE halfway into the $SiO_2$ layer and strip the photoresist. |
| 1120 | Sputter the $1^{st}$ metal layer on the frontside of the wafer. |
| 1122 | Perform Chemical Mechanical Polishing (CMP) to planarize the frontside of wafer. |
| 1124 | On the frontside of the wafer, sequentially deposit another $SiO_2$ layer followed by sputtering a $2^{nd}$ metal layer. The $1^{st}$ and $2^{nd}$ metal layers could be the same or different metals. |
| 1126 | Spin resist and pattern it. |
| 1128 | Etch $2^{nd}$ metal layer and strip photoresist. |
| 1130 | Use the backside $SiO_2$ layer as an etch mask to DRIE the wafer to the frontside $SiO_2$ layer. |
| 1132 | Use either vapor HF or Buffered Oxide Etch (BOE) to etch both the frontside and backside $SiO_2$ layers. The probe device is fully released at this stage. |

According to an embodiment, the lateral actuation electrodes for the side probe tips can be implemented for all the above MiT probe designs.

Implementation of Mobile Circuits with Multiple Integrated Tip Device.

Figure 22:
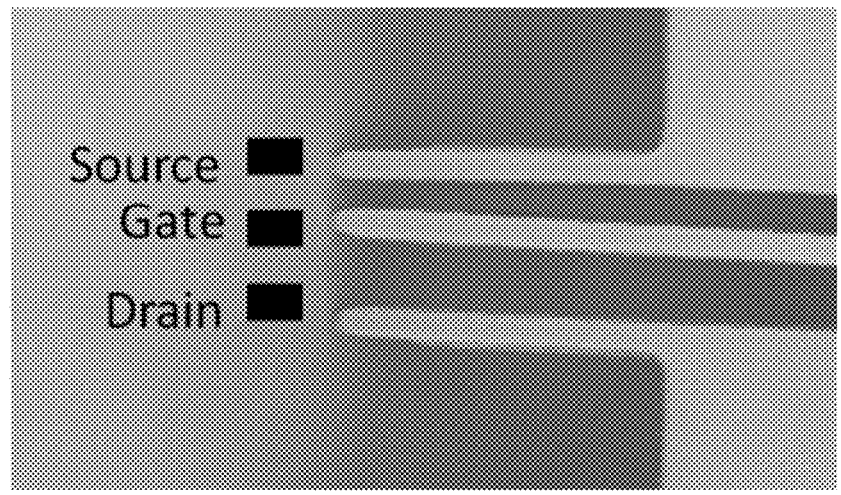
FIG. 22 is a schematic representation of a MiT probe where the middle probe tip represents a gate and the side probe tips are source and drain terminals of a transistor, in accordance with an embodiment.

The MiT probes can be used to implement various active and passive circuit components (transistor, resistor, diode and capacitor) on substrates. Since the MiT probe is capable of electrically mapping different regions of a substrate, at each spot, an active or passive component can be implemented on the substrate. Thus, these components are not lithographically fixed to the substrate but are mobile. For example, the 3-Tips MiT probe can be used to implement a transistor on a substrate. The middle probe tip represents the gate and the side probe tips are the source and drain terminals as shown in FIG. 22. The side tips are in soft contact with the substrate whereas the middle probe tip can either be in soft contact (the tip has a dielectric coating) or proximity (air gap serves as the gate dielectric). At any location on the substrate, a transistor can be formed. Thus, both the output and transfer curves of a transistor can be mapped at each point on the surface of a substrate. The substrate could be a 2D material such as graphene, molybdenum disulphide, silicon substrate, GaN wafer substrate, etc.

Figure 23:
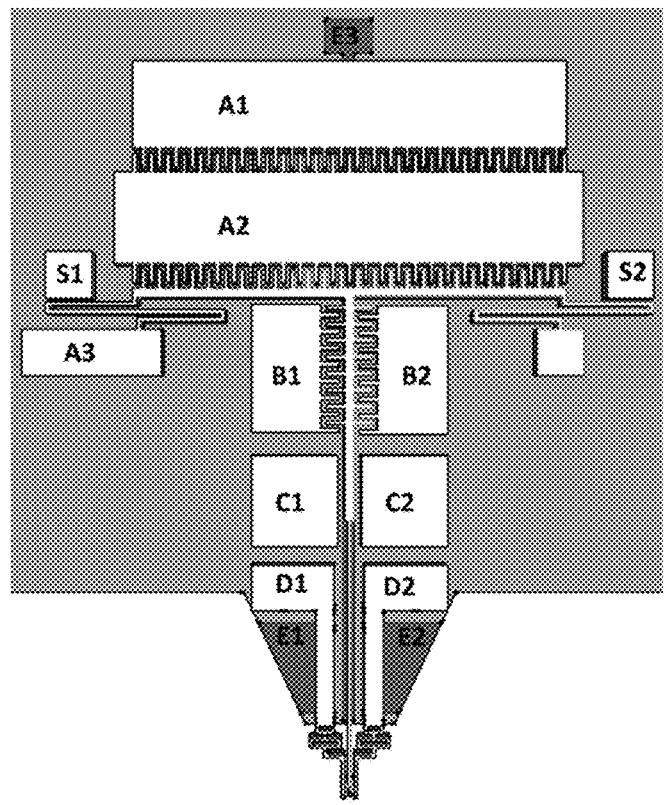
FIG. 23 is a top view schematic representation of a MiT probe, in accordance with an embodiment.
Figure 24:
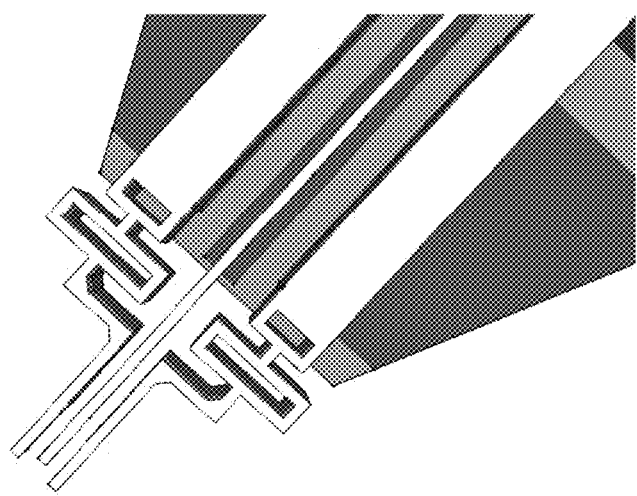
FIG. 24 is a schematic representation of a probe tip of a MiT probe where the middle probe tip is shorter than the side probe tips, in accordance with an embodiment.
Figure 25:
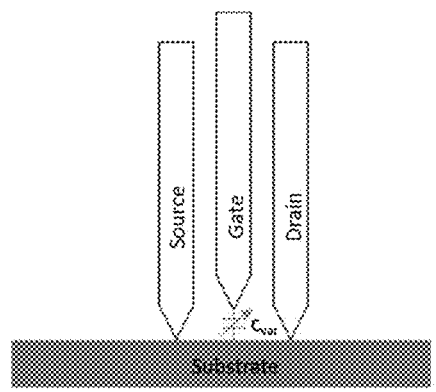
FIG. 25 is a schematic representation of a probe tip of a MiT probe where the middle probe tip is shorter than the side tips, in accordance with an embodiment.
Figure 26:
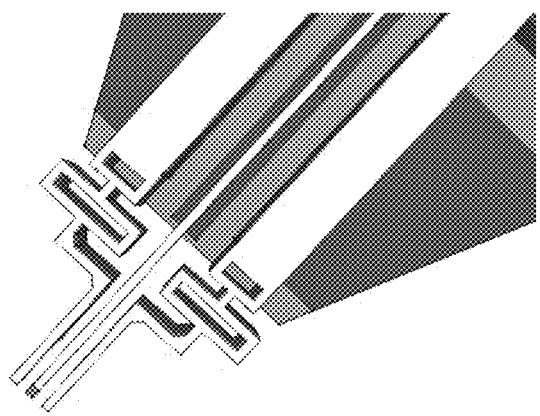
FIG. 26 is a schematic representation of a probe tip of a MiT probe where a high or low-k dielectric is deposited at the apex of the middle probe tip, in accordance with an embodiment.

Referring to FIG. 23 is the design of the 3-Tip MiT probe showing various actuation electrodes. FIGS. 24 and 25 show the tip design of the 3-Tip MiT probe and the gate capacitance between the middle probe tip and the substrate respectively. The middle tip is designed to be shorter than the side probe tips. The gate capacitance can be varied by applying DC voltages to electrode A2 which would retract or extend the middle probe tip. Thus, the effect of the gate capacitance on the transistor performance can be measured and investigated. FIG. 26 on the other hand shows a 3-Tip MiT probe which has a few nanometers of either high or low-k dielectric that is deposited at the apex of the middle probe tip. The dielectric layer serves as the gate oxide and the middle probe tip is aligned with the side probe tips.

Figure 27:
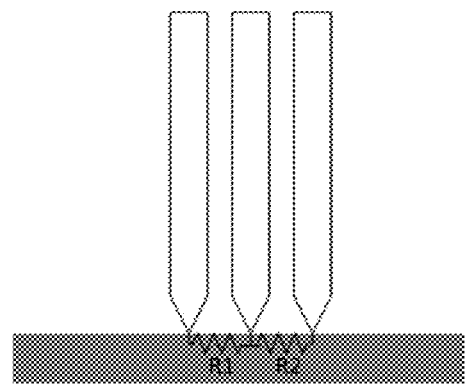
FIG. 27 is a schematic representation of resistors which can be implemented with an MiT probe, in accordance with an embodiment.
Figure 28:
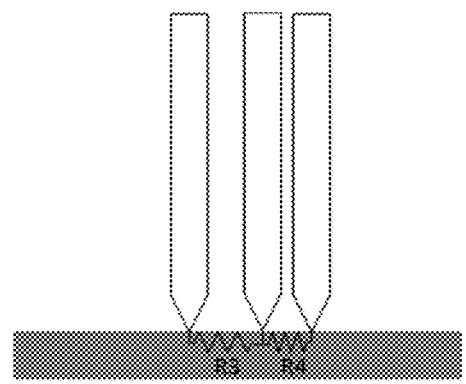
FIG. 28 is a schematic representation of a variable resistor which can be implemented with an MiT probe, in accordance with an embodiment.

A variable resistor on the other hand can be implemented by changing the spacing between the middle probe tip and any of the side tips. Applied voltages to C1 or C2 would laterally deflect the middle probe tip. By varying the tip spacing and contacting the substrate, different substrate resistance values can be achieved as demonstrated in FIGS. 27 and 28.

Figure 29:
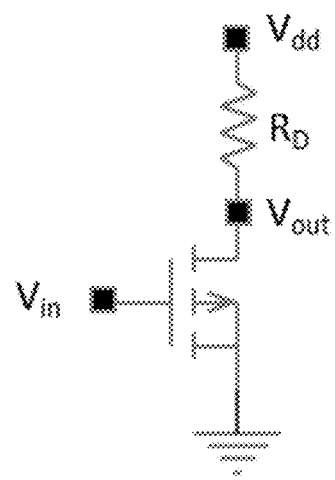
FIG. 29 is a schematic representation of a common source amplifier which can be implemented with a MiT probe, in accordance with an embodiment.

Two or more active or passive circuit components that are implemented with two or more MiT probes can be cascaded to form various circuits such as common source amplifier, common gate amplifier, a source follower, etc. FIG. 29 shows the typical circuit configuration of a common source amplifier. This circuit could be implemented by at least a 3-Tip MiT probe and either a 2, 3, or 4-Tip MiT probe. As an example, two 3-Tip MiT probes where one of the MiT probes would implement the transistor and the other would implement the resistor. Or a 3-Tip MiT probe for the transistor and 2-Tips or 4-Tips MiT probe for the resistor.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A microscope probe configured to analyze a sample, the microscope probe comprising:
   a movable probe supported by a substrate;
   a first actuator configured to displace the movable probe along a first axis;
   a detection component configured to detect motion of the movable probe in response to an applied signal;
   a resonator configured to vibrate the movable probe when the microscope probe is in a vibrational mode; and
   a compensation capacitor affixed to the substrate and connected in parallel with the resonator, wherein the compensation capacitor is configured to cancel parasitic capacitance corresponding to the resonator.

2. The microscope probe of claim 1, wherein at least a portion of the movable probe is attached to a spacer, the spacer fixedly secured to a top surface of the substrate.

3. The microscope probe of claim 1, wherein the capacitor comprises a plurality of interdigitated fingers wherein at least a first finger and a second finger of the plurality of interdigitated fingers are separated by an air-gap.

4. The microscope probe of claim 1, wherein the resonator comprises a plurality of interdigitated fingers wherein at least a first finger and a second finger of the plurality of interdigitated fingers are separated by an air-gap.

5. The microscope probe of claim 1, wherein the capacitor comprises a first plurality of interdigitated fingers wherein a first finger and a second finger of the first plurality of interdigitated fingers are separated by an air-gap;
   wherein the resonator comprises a second plurality of interdigitated fingers wherein a first finger and a second finger of the second plurality of interdigitated fingers are separated by an air-gap; and
   wherein the first finger of the first plurality of interdigitated fingers of the capacitor and the first finger of the second plurality of interdigitated fingers of the resonator are connected to the first actuator.

6. The microscope probe of claim 1, further comprising:
   an electrode, wherein, along a direction perpendicular to a top surface of the substrate, the electrode is disposed between the movable probe and the substrate.

7. The microscope probe of claim 1, wherein the resonator and the compensation capacitor are structurally identical and monolithically integrated on the substrate.

\* \* \* \* \*